(12) United States Patent
Usui et al.

(10) Patent No.: US 6,835,028 B2
(45) Date of Patent: Dec. 28, 2004

(54) INDEXABLE INSERT AND CUTTING TOOL

(75) Inventors: Hiroshi Usui, Aichi (JP); Takayuki Kagami, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 10/757,517

(22) Filed: Jan. 15, 2004

(65) Prior Publication Data
US 2004/0146365 A1 Jul. 29, 2004

(30) Foreign Application Priority Data

Jan. 16, 2003 (JP) ........................................ 2003-008908

(51) Int. Cl.⁷ .............................................. B23B 27/06
(52) U.S. Cl. ..................................... 407/114; 407/115
(58) Field of Search .............................. 407/113, 114, 407/115, 116, 33

(56) References Cited

U.S. PATENT DOCUMENTS

| | | | | |
|---|---|---|---|---|
| 3,777,341 A | * | 12/1973 | Faber | 407/114 |
| 4,632,608 A | * | 12/1986 | Blomberg et al. | 407/114 |
| 4,681,488 A | * | 7/1987 | Markusson | 407/114 |
| 5,505,569 A | * | 4/1996 | Gustafsson et al. | 407/113 |
| 5,634,745 A | | 6/1997 | Wiman et al. | |
| 6,217,263 B1 | * | 4/2001 | Wiman et al. | 407/114 |
| 6,244,791 B1 | * | 6/2001 | Wiman et al. | 407/114 |
| 6,623,218 B1 | | 9/2003 | Koide | |

2002/0127068 A1    9/2002   Kinukawa et al.

FOREIGN PATENT DOCUMENTS

| | | |
|---|---|---|
| JP | 5-53804 U | 7/1993 |
| JP | 8-507976 A | 8/1996 |
| JP | 2556520 Y2 | 8/1997 |
| JP | 10-500363 A | 1/1998 |
| JP | 2000-280103 A | 10/2000 |
| JP | 2000-288803 A | 10/2000 |
| JP | 2001-157903 A | 6/2001 |
| JP | 2002-192407 A | 7/2002 |
| WO | WO 95/00272 A1 | 1/1995 |

* cited by examiner

*Primary Examiner*—Willmon Fridie, Jr.
(74) *Attorney, Agent, or Firm*—Sughrue Mion, PLLC

(57) ABSTRACT

An indexable insert for application to turning of a cast iron product, including a first minor cutting edge 21 having a radius Ra and a second minor cutting edge 22 having a radius Rb successively provided between an arcuate nose cutting-edge 12 having a nose radius R and a linear cutting edge 16 so as to extend from the nose tip to the linear cutting edge 16. At a connection point P1 between the arcs assumed by the cutting edges 12 and 21, a smaller intersectional angle θx of a tangent T12 and a tangent T21 to the respective arcs is 1° or less. Also, at a connection point P2 between the arcs assumed by the cutting edges 21 and 22, a smaller intersectional angle θy of the tangent T21 and a tangent T22 to the respective arcs is 1° or less. The radii R, Ra, and Rb are set to the dimensional relationships "Ra>R, Ra falls within a range of 3 mm to 20 mm, and Rb≧1.5Ra."

8 Claims, 4 Drawing Sheets

INDEXABLE INSERT AND CUTTING TOOL

BACKGROUND OF THE INVENTION

1. Field of the Invention

The present invention relates to an indexable insert (also known in the art as a throwaway tip) for turning use and to a cutting tool configured such that the indexable insert is clamped on a tool holder.

2. Description of the Related Art

Finished-surface roughness (Ry) associated with turning is expressed by $Ry \cong f^2/8R$, where R is a nose radius, and f is a feed. In principle, an arc assumed by a nose of an indexable insert (the nose radius is usually 0.4 mm to 3.2 mm) is transferred intact to a cut surface, thereby determining finished-surface roughness. Accordingly, for a given feed, the greater the nose radius, the greater the improvement in surface roughness. However, since the width of a portion of a nose cutting-edge in contact with a workpiece increases with the nose radius, an increase in the nose radius can disadvantageously result in chattering. Therefore, an important measure is to determine the nose radius while a balance between improvement in surface roughness and prevention of chattering is achieved.

Turning a workpiece of cast iron involves, in addition to the above problems, the following phenomenon: since cast iron exhibits carbon segregation stemming from its constitution, turning results in digging-up the carbon segregated portions that are cut. Thus, even in finishing in which the depth of cut is small, an open bore, plucking, or the like arises on the finished surface, resulting in a failure to obtain a sufficiently improved finished-surface roughness. In order to improve the roughness of a machined surface of such a workpiece, known indexable inserts are configured such that a minor cutting edge (also called a "sweeper cutting-edge" or a "wiper cutting-edge") is formed between an arcuate cutting edge having a nose radius and a linear cutting edge (a side portion of a tip). The minor cutting edge assumes the form of a straight line substantially in parallel with the cutting feed direction (in cylindrical turning, the direction of the axis of rotation of a workpiece) or the form of an arc (curved line) having a radius different from the nose radius (See Patent Documents 1 to 3, identified below). An indexable insert having such a minor cutting edge is used to improve the shape transferred to a finished surface, to thereby improve theoretical surface roughness. An indexable insert having such a minor cutting edge is expected to improve surface roughness through the following mechanism: the minor cutting edge is engaged in cutting and burnishing to thereby plastically smooth a rugged machined surface.

In the indexable insert disclosed in Patent Document 1, a linear minor cutting edge having a length of 0.02 mm to 0.2 mm is provided between a nose portion and a linear cutting edge. In the indexable insert disclosed in Patent Document 2, an arcuate minor cutting edge is provided between an arcuate nose portion having a nose radius R and a linear cutting edge so as to satisfy the relation "(nose radius)< (radius of arcuate minor cutting edge)." In the indexable insert disclosed in Patent Document 3, two arcuate cutting edges having radii r2 and r3, respectively, are provided between an arcuate nose portion having a nose radius (rε) and a linear cutting edge as to satisfy the relation "r2<rε<r3."

[Patent Document 1]
Japanese Utility Model Registration No. 2556520

[Patent Document 2]
Japanese Kohyo (PCT) Patent Publication No. 8-507976

[Patent Document 3]
Japanese Kohyo (PCT) Patent Publication No. 10-500363

3. Problems to be Solved by the Invention

The results of various cutting tests conducted by the prevent inventors have revealed that use of the indexable inserts described in the above Patent Documents 1 to 3 can cause serious problems as described below. In the case of the indexable insert described in Patent Document 1, the length of the linear minor cutting edge (linear wiper cutting-edge) is as small (short) as 0.2 mm or less, which is too short to effect burnishing in turning a workpiece of cast iron as well as too short to be applied to a high-speed feed. Additionally, the linear minor cutting edge is set such that, when the cutting tool is fed (caused to travel) longitudinally in cylindrical turning, the minor cutting edge angle becomes 1 degree (1 degree in relation to the axis of rotation (hereinafter also referred to as the "axis") of a workpiece) as measured on the rear side in relation to the direction of the feed.

However, the actual practice of cutting involves an error associated with clamping of the indexable insert in a tip pocket of a holder or an error associated with clamping of the holder on a tool rest. These errors are usually about ±1 degree. In some cases, such an error causes the indexable insert described in Patent Document 1 to assume a condition such that the linear minor cutting edge and the axis become parallel (form an angle of 0 degree) with each other. In such a case, cutting resistance increases, resulting in the occurrence of chattering. In the case where such a error causes the linear minor cutting edge to form an angle of 2 degrees with the axis, the cutting edge angle to a work surface increases, and thus machined-surface roughness (maximum roughness Ry) increases, resulting in impairment in finished-surface condition. That is, because of an unavoidable error in relation to the minor cutting edge angle, the indexable insert described in Patent Document 1 fails to consistently provide highly improved finished-surface roughness.

The indexable insert described in Patent Document 2 is designed to perform cutting such that the lowest point (a point at which a cutting edge is tangent to a line parallel with the axis of rotation) is located on the arcuate minor cutting edge, which assumes the form of a single arc having a radius greater than the nose radius, and thus can basically provide highly improved finished-surface roughness. However, since only the linear cutting edge, which is a portion of a side of the tip, is provided behind the arcuate minor cutting edge, the effect of burnishing a machined surface is not expected. For this reason, in the case of a workpiece of cast iron, a glossy finished surface cannot be obtained. In the case of turning by use of the indexable insert, in order to obtain a glossy finished surface, polishing must be performed after turning, disadvantageously resulting in an increase in machining man-hours.

In the case of the indexable insert described in Patent Document 3, since the nose radius (rε) and the radius r2 of an arc following the nose have the relation "r2<rε," cutting by the cutting edge having the radius r2 impairs surface roughness. Thus, in order to improve surface roughness, cutting is performed such that the arcuate cutting edge having the radius r3, which is connected to the arcuate cutting edge having the radius r2 (r2<rε<r3) on the side opposite the nose (on the side toward the linear cutting edge), includes the lowest point. However, in this case, for a reason similar to that in the case of the indexable insert described in Patent Document 2; i.e., since only the linear cutting edge is provided behind the arcuate cutting edge having the radius r3, the effect of burnishing a machined surface is not expected, thus resulting in a problem similar to that in the case of the indexable insert described in Patent Document 2.

SUMMARY OF THE INVENTION

In view of the above-described problems of conventional indexable inserts, an indexable insert of the present invention has been devised on the basis of the results of extensive cutting tests. That is, an object of the present invention is to provide an indexable insert which, in application to turning of a cast iron product, does not cause chattering and can provide a glossy, highly improved, finished surface.

The above object has been achieved by providing the following embodiments and aspects of the invention:

(1) An indexable insert adapted for turning, which comprises a nose cutting-edge having a nose radius R, a linear cutting edge, and a minor cutting edge formed between the nose cutting-edge and the linear cutting edge, wherein the minor cutting edge comprises a first minor cutting edge having a radius Ra and a second minor cutting edge having a radius Rb, the first and second minor cutting edges successively extending from a nose tip (the center of the nose cutting-edge) to the linear cutting edge;

the nose cutting-edge and the first minor cutting edge are connected such that, at a connection point between an arc assumed by the nose cutting-edge and an arc assumed by the first minor cutting edge, a smaller intersectional angle $\theta x$ of a tangent T12 and a tangent T21 to the respective arcs is 1° or less;

the first minor cutting edge and the second minor cutting edge are connected such that, at a connection point between the arc assumed by the first minor cutting edge and an arc assumed by the second minor cutting edge, a smaller intersectional angle $\theta y$ of the tangent T21 and a tangent T22 to the respective arcs is 1° or less; and the radius Ra of the first minor cutting edge, the radius Rb of the second minor cutting edge, and the nose radius R are set to the dimensional relationships "Ra$\geq$R, Ra falls within a range of 3 mm to 20 mm, and Rb$\geq$1.5 Ra."

Preferably, both of the angles $\theta x$ and $\theta y$ are 1° or less, since a sharp increase in the value of surface roughness can be suppressed.

(2) An indexable insert according to (1), characterized in that the connection point between the arc assumed by the nose cutting-edge and the arc assumed by the first minor cutting edge projects outwardly in relation to the adjacent arcs, and the connection point between the arc assumed by the first minor cutting edge and the arc assumed by the second minor cutting edge projects outwardly in relation to the adjacent arcs.

Formation of the outwardly projecting connection points facilitates working in the course of manufacture and is thus preferred.

(3) An indexable insert according to (1) or (2), characterized in that the angle $\theta x$ and/or the angle $\theta y$ is 0°.

Setting the angle $\theta x$ and/or the angle $\theta y$ to 0° enhances the effect of suppressing a sharp increase in the value of surface roughness and is thus preferred.

In cylindrical turning using the indexable insert of the present invention, a cutting tool is fed longitudinally while the first minor cutting edge, which has a radius Ra greater than the nose radius R, serves as an end cutting edge. In this case, since Ra>R, the first minor cutting edge having a radius Ra contributes to improvement in theoretical surface roughness. Furthermore, the second minor cutting edge subsequent to the first minor cutting edge and having the radius Rb greater than the radius Ra of the first minor cutting edge rubs a cut surface to thereby burnish the cut surface. Thus, even in the case of a workpiece of cast iron, a finished surface becomes glossy; i.e., exhibits highly improved finished-surface roughness. When Ra is less than 3 mm, the burnishing effect attained by the second minor cutting edge is impaired, resulting in a failure to obtain burnish. When Ra is in excess of 20 mm, the width of contact of the end cutting edge with a workpiece increases, causing chattering and thus impairing surface roughness. When the radius Rb of the second minor cutting edge is less than 1.5 Ra, the burnishing effect becomes insufficient. The greater the value of Rb, the greater the attained burnishing effect. Thus, in terms of practice of burnishing, the second minor cutting edge may assume the form of a straight line.

(4) An indexable insert according to any one of (1) to (3), characterized in that the central angle $\theta 1$ of the arc assumed by the first minor cutting edge falls within a range of 2 degrees to 4 degrees. When the indexable insert is clamped on a holder or when the holder is clamped on a tool rest, a clamping-angle error is unavoidable. Since the clamping-angle error is up to 2 degrees, employing a central angle $\theta 1$ of 2 degrees or more suppresses impairment in finished-surface roughness. Employing a central angle $\theta 1$ of 4 degrees or less decreases the length of a cutting edge exploited for cutting; thus, at a certain clamping angle, the width of contact of the first minor cutting edge with a workpiece is decreased, so that chattering becomes unlikely to occur. Therefore, a central angle $\theta 1$ of 2 degrees to 4 degrees is preferred.

(5) An indexable insert according to any one of (1) to (4), characterized in that the arc assumed by the second minor cutting edge has a chordal length of 0.2 mm or more. The second minor cutting edge, together with the first minor cutting edge, performs burnishing. Thus, when the chord of the second minor cutting edge has a length of 0.2 mm or more, the width of a cutting edge exploited for burnishing becomes sufficiently large, so that burnishing is improved. Increasing the chordal length of the arc assumed by the second minor cutting edge allows an increase in the cutting feed.

(6) An indexable insert according to any one of (1) to (4), characterized in that the second minor cutting edge assumes the form of a straight line in place of the arc (namely, an arc having an infinite radius). As mentioned previously, the greater the radius Rb of the second minor cutting edge, the greater the burnishing effect. In other words, in terms of burnishing, as in the case of (4), the second minor cutting edge may assume the form of a straight line.

(7) An indexable insert according to any one of (1) to (6), characterized in that an outwardly projecting arcuate cutting edge is provided at a connection point between the second minor cutting edge and the linear cutting edge. In the case of contour turning in which a diameter-reducing taper portion of a workpiece is machined subsequent to cylindrical turning, and the connection point between the second minor cutting edge and the linear cutting edge comes into contact with the workpiece, a cutting edge including a jag (pointed portion) present at the connection point performs turning. As a result, the taper portion becomes inferior to the cylindrical portion in finished-surface roughness. However, when the indexable insert according to the invention described in (5) is used, a cutting edge region including the arcuate cutting edge provided at the connection point performs cutting, thereby preventing such impairment in surface roughness.

(8) A cutting tool (turning tool) comprising an indexable insert according to any one of (1) to (7) and a tool holder, the indexable insert being clamped on the tool holder.

Effect of the Invention

The turning a workpiece of cast iron using the indexable insert of the present invention or a cutting tool employing the indexable insert can prevent chattering and can provide a sufficiently glossy finished surface.

Figure 1:
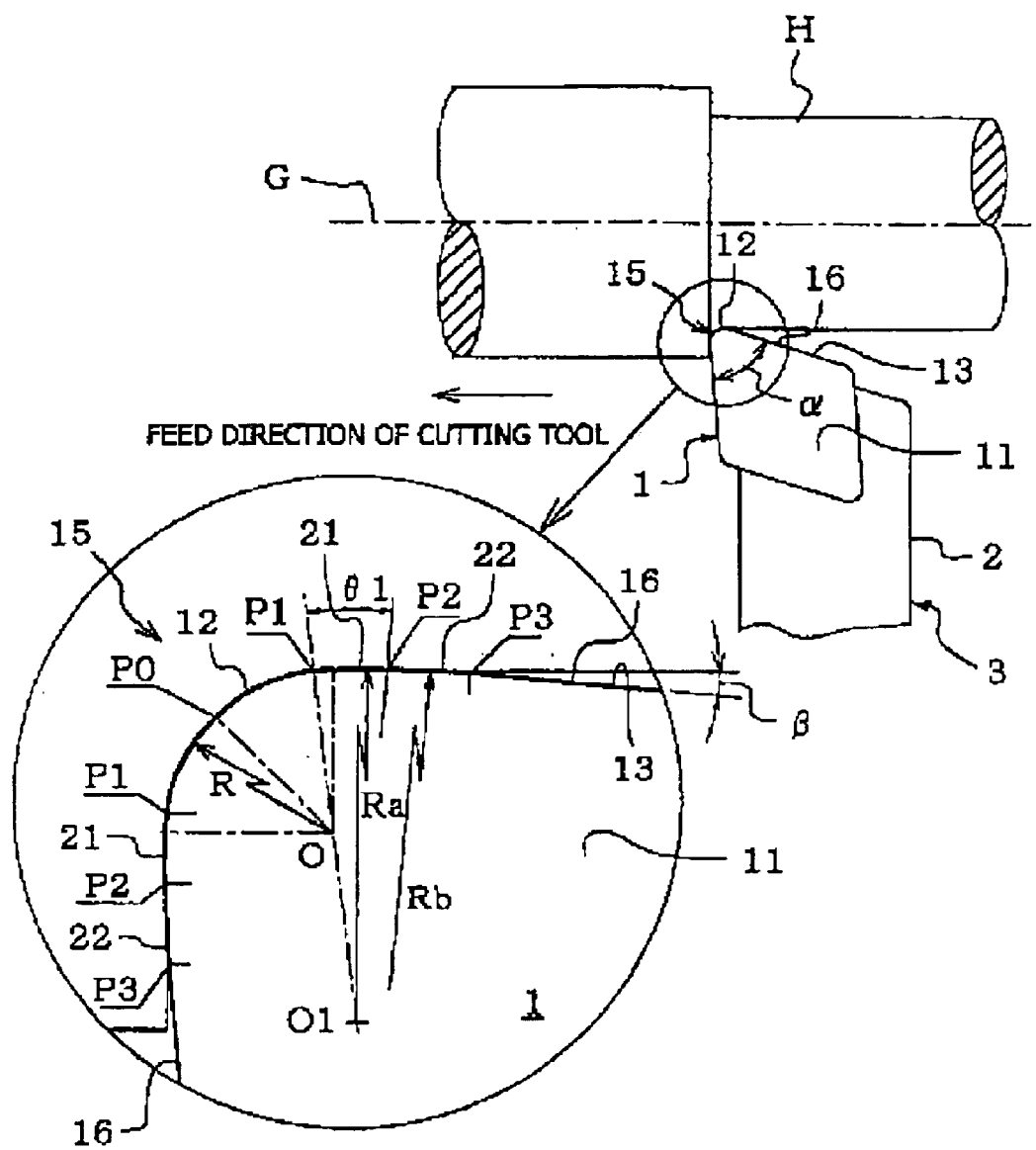
FIG. 1 is a view from the rake face side of an indexable insert and a cutting tool according to a first embodiment of the present invention, accompanied by an enlarged view of a nose cutting-edge of the indexable insert and its peripheral portions.

Reference numerals used to denote various structural elements of the indexable insert and cutting tool are as follows:

1, 31: indexable insert
2: tool holder
3: cutting tool
12: nose cutting-edge
16: linear cutting edge
19: arcuate cutting edge corresponding to the connection point between the second minor cutting edge and the linear cutting edge
21: first minor cutting edge
22: second minor cutting edge
R: nose radius
Ra: radius of the first minor cutting edge
Rb: radius of the second minor cutting edge
P0: nose tip
P1: connection point between the arc assumed by the nose cutting-edge and the arc assumed by the first minor cutting edge
P2: connection point between the arc assumed by the first minor cutting edge and the arc assumed by the second minor cutting edge
θ1: central angle of the arc assumed by the first minor cutting edge
θx: smaller intersectional angle of tangents which are drawn to the arc assumed by the nose cutting-edge and the arc assumed by the first minor cutting edge, respectively, at the connection point between the arcs
θy: smaller intersectional angle of tangents which are drawn to the arc assumed by the first minor cutting edge and the arc assumed by the second minor cutting edge, respectively, at the connection point between the arcs
L: length of the chord of the arc assumed by the second minor cutting edge.

DESCRIPTION OF THE PREFERRED EMBODIMENTS

In this specification, "degree" and the symbol (°) are used interchangeably and have the same meaning.

Figure 2:
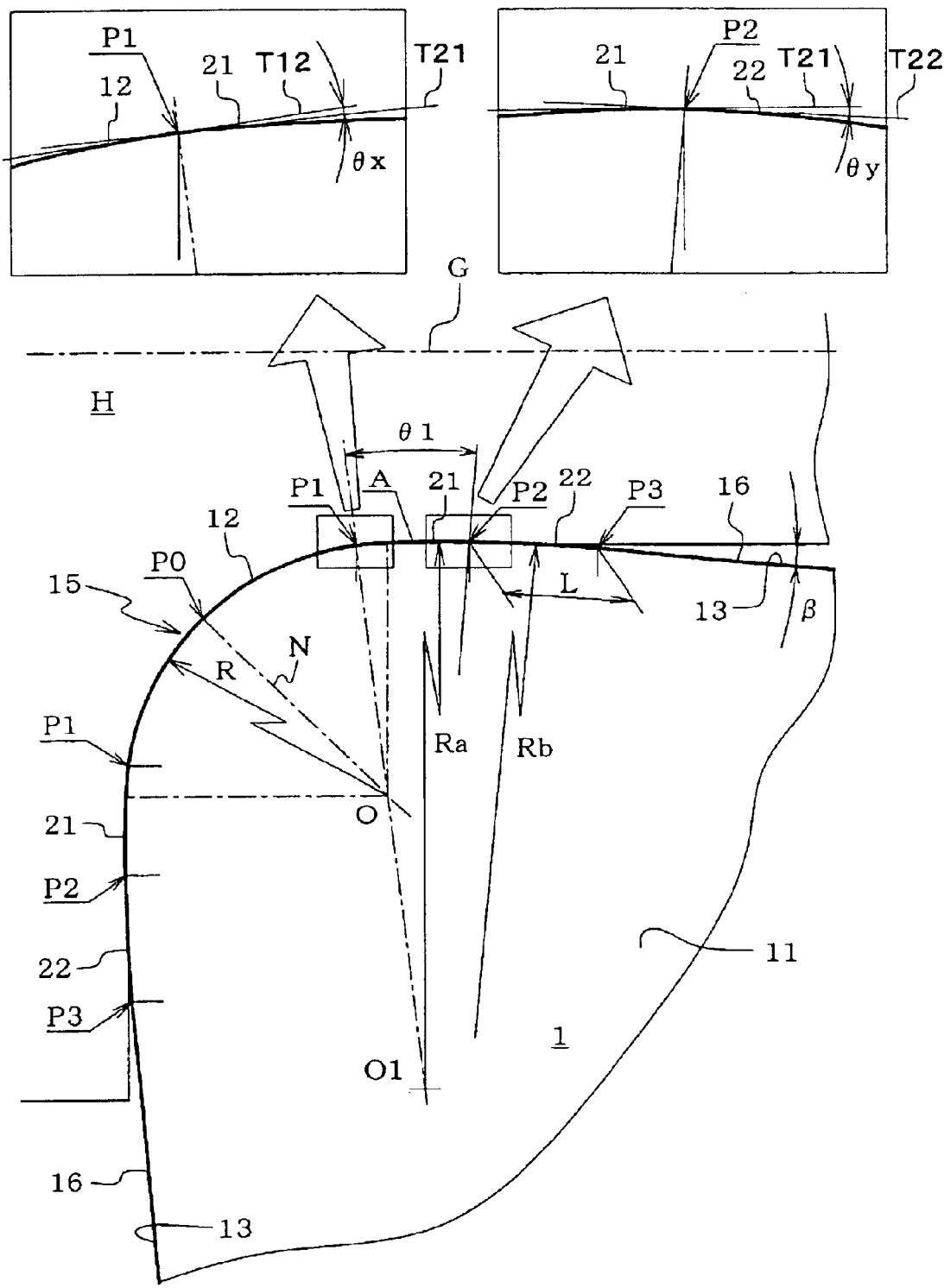
FIG. 2 is a further enlarged view of the enlarged view in FIG. 1.

A first embodiment of the present invention will next be described in detail with reference to FIGS. 1 and 2. FIG. 1 is a view from the rake face 11 side of a cutting tool 3 configured such that an indexable insert 1 of the present invention is clamped on a tool holder 2, accompanied by an enlarged view of a nose cutting-edge (hereinafter also referred to as a "nose") 12 of the indexable insert 1 and its peripheral portions. FIG. 2 is a further enlarged view of the enlarged view in FIG. 1. The indexable insert 1 of the present embodiment has a clamp hole formed therein; assumes a substantially rhombus shape having a constant thickness; and has a nose angle α of 80 degrees. In the present embodiment, the indexable insert 1 is configured such that a flank 13 and the rake face 11 meet at a cutting edge and form an angle of 90 degrees, and the rake face 11 is flat. Further, the indexable insert 1 is clamped, by means of a so-called double clamp mechanism, in a tip pocket formed in a distal end of the holder 2. In the present embodiment, the indexable insert 1 has two identical noses; thus, the below description addresses one of the noses.

In the indexable insert 1 of the present embodiment, a nose portion 15 has the nose cutting-edge 12, which assumes an arcuate shape having a nose radius R; a linear cutting edge 16; and minor cutting edges, which are formed between the nose cutting-edge 12 and the linear cutting edge 16 as described below. That is, in the present embodiment, a first minor cutting edge 21 having a radius Ra and a second minor cutting edge 22 having a radius Rb are provided to successively extend from the nose cutting-edge 12, which assumes an arcuate shape having a nose radius R, to the linear cutting edge 16. The nose portion 15 and its peripheral portion are formed so as to assume an outwardly convex curve. The nose cutting-edge 12 and the first minor cutting edge 21 are connected such that, at a connection point P1 between an arc assumed by the nose cutting-edge 12 and an arc assumed by the first minor cutting edge 21, a smaller intersectional angle θx of a tangent T12 and a tangent T21 to the respective arcs is 1° or less. The first minor cutting edge 21 and the second minor cutting edge 22 are connected such that, at a connection point P2 between the arc assumed by the first minor cutting edge 21 and an arc assumed by the second minor cutting edge 22, a smaller intersectional angle θy of the tangent T21 and a tangent T22 to the respective arcs is 1° or less. In other words, when the angle θx is 0°, the center of curvature O1 of the arc having a radius Ra is positioned on a straight line connecting the connection point P1 and the center of curvature O of the arc having the radius R. When the angle θy is 0°, the center of curvature (not shown) of the arc having a radius Rb is positioned on a straight line connecting the connection point P2 and the center of curvature O1 of the arc having the radius Ra. In FIGS. 1 and 2, reference numeral P3 denotes a connection point between the arc assumed by the second minor cutting edge 22 and the linear cutting edge 16. In the present embodiment, the connection point between the arc assumed by the nose cutting-edge and the arc assumed by the first minor cutting edge projects outwardly in relation to the adjacent arcs, and the connection point between the arc assumed by the first minor cutting edge and the arc assumed by the second minor cutting edge projects outwardly in relation to the adjacent arcs.

In the present embodiment, the nose portion 15 is axisymmetric with respect to the bisector N of the nose angle α. In FIGS. 1 and 2, reference numeral P0 denotes a nose tip (the center of the nose cutting-edge 12). The radii R, Ra, and Rb are set as follows: Ra>R; Ra falls within a range of 3 mm to 20 mm; and Rb≧1.5 Ra. The indexable insert 1 of the present embodiment is formed as follows: when the indexable insert 1 is clamped on the holder 2 with a minor cutting edge angle β set to 5 degrees, in the case of external turning, the midpoint of the arc having the radius Ra and extending between the connection points P1 and P2; i.e., the midpoint A of the first minor cutting edge 21, is brought closest to the axis of rotation G of a workpiece H, whereas, in the case of internal turning, the midpoint A is brought farthest away from the axis of rotation of a workpiece.

In cylindrical cutting of a cast iron member, the indexable insert 1 of the present embodiment is clamped on the holder 2, and the minor cutting edge angle β is set to 5 degrees. In this case, cutting is performed such that the point A located in a central region of the first minor cutting edge 21 is brought closest to the axis of rotation G of the workpiece H. This contributes to improvement of theoretical surface roughness, since Ra>R as mentioned above. Specifically, the first minor cutting edge 21 and the second minor cutting edge 22, which follows the first minor cutting edge 21 and whose radius Rb is greater than the radius Ra of the first minor cutting edge 21, burnish the cut surface. Thus, even when the workpiece H is made of cast iron, the cut surface assumes a glossy finish with highly improved finished-surface roughness.

Preferably, the indexable insert 1 is formed such that the central angle θ1 of the arc assumed by the first minor cutting edge 21 and having the radius Ra falls within a range of 2 degrees to 4 degrees. When the central angle θ1 falls within the specified range, finished-surface roughness is not impaired, so long as an unavoidable error in relation to clamping angle is of an ordinary degree. Also, the width of contact of the first minor cutting edge 21 with a workpiece (the width of the cutting edge as viewed from the rake face side) does not become too large, to thereby prevent chattering.

Various indexable insert samples were fabricated such that the nose diameter R was 0.8 mm (constant), and the radius of curvature Ra of the first minor cutting edge 21, the radius of curvature Rb of the second minor cutting edge 22, and Rb/Ra were varied. By use of an ordinary lathe, the indexable insert samples were subjected to an external (cylindrical) turning test under the conditions below. The central angle θ1 of the arc having the radius Ra was set to 3 degrees (constant), and the length L of a chord connecting opposite ends P2 and P3 of the arc having the radius Rb was set to 0.4 mm (constant). The lowest point (point A) was set substantially at the center (a point of halving the central angle θ1) of the arc having the radius Ra and assumed by the first minor cutting edge 21. The term "straight" appearing in the "Rb" subcolumn of the "second minor cutting edge" column in Table 1 indicates that the second minor cutting edge 22 does not assume the form of an arc, but assumes the form of a straight line. Judgment was based on the occurrence of chattering and the condition of burnish of a finished surface. The test results are shown in Table 1. In Table 1, dimensions are in units of mm, and θ1 is in units of degrees (°).

Notably, in the experimental examples appearing below, the angles θx and θy are 0° unless otherwise specified.

In the "cutting test results" column of Table 1, symbols indicative of judgment appearing in the "chattering" subcolumn are as follows:
XX: chattering observed; BB: chattering hardly observed; and AA: chattering not observed at all. Symbols indicative of judgment appearing in the "burnish" subcolumn are as follows: XX: no burnish; BB: substantially satisfactory burnish; and AA: sufficient burnish. The workpiece H was made of plain cast iron (FC200) and had a diameter of 200 mm. Cutting conditions were as follows: surface speed: 500 m/min; feed: 0.3 mm/rev to 0.7 mm/rev; depth of cut: 1 mm; and cutting fluid not employed. The holder and indexable inserts were in the following shape: holder: CCLNR2525 shape (ISO); and indexable inserts: CNGA43 shape (ISO). These conditions are also applied to other tests described below.

TABLE 1

| Nose | First minor cutting edge | | Second minor cutting edge | | | Cutting test results | |
|---|---|---|---|---|---|---|---|
| R | Ra (mm) | θ1(°) | L (mm) | Rb (mm) | Rb/Ra | Chattering | Burnish |
| 0.8 | 2.4 | 3 | 0.4 | 2.4 | 1 | AA | XX |
| 0.8 | 2.4 | 3 | 0.4 | 3.6 | 1.5 | AA | XX |
| 0.8 | 2.4 | 3 | 0.4 | 60 | 25 | AA | XX |
| 0.8 | 2.4 | 3 | 0.4 | Straight | ∞ | AA | XX |
| 0.8 | 3 | 3 | 0.4 | 3.0 | 1 | AA | XX |
| 0.8 | 3 | 3 | 0.4 | 4.5 | 1.5 | AA | AA |
| 0.8 | 3 | 3 | 0.4 | 75 | 25 | AA | AA |
| 0.8 | 3 | 3 | 0.4 | Straight | ∞ | AA | AA |
| 0.8 | 10 | 3 | 0.4 | 10.0 | 1 | AA | XX |
| 0.8 | 10 | 3 | 0.4 | 15.0 | 1.5 | AA | AA |
| 0.8 | 10 | 3 | 0.4 | 250 | 25 | AA | AA |
| 0.8 | 10 | 3 | 0.4 | Straight | ∞ | AA | AA |
| 0.8 | 20 | 3 | 0.4 | 20.0 | 1 | AA | XX |
| 0.8 | 20 | 3 | 0.4 | 30.0 | 1.5 | AA | AA |
| 0.8 | 20 | 3 | 0.4 | 500 | 25 | AA | AA |
| 0.8 | 20 | 3 | 0.4 | Straight | ∞ | AA | AA |
| 0.8 | 24 | 3 | 0.4 | 24.0 | 1 | XX | XX |
| 0.8 | 24 | 3 | 0.4 | 36.0 | 1.5 | XX | XX |
| 0.8 | 24 | 3 | 0.4 | 600 | 25 | XX | XX |
| 0.8 | 24 | 3 | 0.4 | Straight | ∞ | XX | XX |

As shown in Table 1, when turning was performed by use of the indexable inserts satisfying the dimensional relationships "Ra>R, Ra falls within a range of 3 mm to 20 mm, and Rb≧1.5 Ra," turning did not result in chattering, and the corresponding finished surfaces exhibited sufficient burnish. By contrast, as shown in Table 1, when turning was performed using the other indexable inserts, the condition of turning was problematic or unsatisfactory in terms of burnish and the occurrence of chattering. Turning by use of the indexable inserts having a first minor cutting edge 21 whose radius Ra was 2.4 mm failed to burnish the finished surfaces, conceivably because the length of contact of the first minor cutting edge 21 with the workpiece was insufficient. Turning by use of the indexable inserts having the first minor cutting edge 21 whose radius was 24 mm resulted in chattering, conceivably because the length of contact of the first minor cutting edge 21 with the workpiece was excessively great.

Next, a similar test was conducted while the central angle θ1 of the arc assumed by the first minor cutting edge 21 and having the radius of curvature Ra, and the radius ratio, Rb/Ra, between the first and second minor cutting edges 21 and 22 were varied. The test results are shown in Table 2. The nose radius R was 0.8 mm (constant); the radius of curvature Ra of the first minor cutting edge 21 was 4 mm (constant); and the length L of the chord connecting opposite ends P2 and P3 of the arc assumed by the second minor cutting edge 22 and having the radius Rb was 0.4 mm (constant).

TABLE 2

| Nose | First minor cutting edge | | Second minor cutting edge | | | Cutting test results | |
|---|---|---|---|---|---|---|---|
| | Ra | | | | | | |
| R | (mm) | θ1(°) | L (mm) | Rb (mm) | Rb/Ra | Chattering | Burnish |
| 0.8 | 4 | 1.5 | 0.4 | 4.0 | 1 | AA | XX |
| 0.8 | 4 | 1.5 | 0.4 | 6.0 | 1.5 | AA | BB |
| 0.8 | 4 | 1.5 | 0.4 | 100 | 25 | AA | BB |
| 0.8 | 4 | 1.5 | 0.4 | Straight | ∞ | AA | BB |
| 0.8 | 4 | 2 | 0.4 | 4.0 | 1 | AA | XX |
| 0.8 | 4 | 2 | 0.4 | 6.0 | 1.5 | AA | AA |
| 0.8 | 4 | 2 | 0.4 | 100 | 25 | AA | AA |
| 0.8 | 4 | 2 | 0.4 | Straight | ∞ | AA | AA |
| 0.8 | 4 | 3 | 0.4 | 4.0 | 1 | AA | XX |
| 0.8 | 4 | 3 | 0.4 | 6.0 | 1.5 | AA | AA |
| 0.8 | 4 | 3 | 0.4 | 100 | 25 | AA | AA |
| 0.8 | 4 | 3 | 0.4 | Straight | ∞ | AA | AA |
| 0.8 | 4 | 4 | 0.4 | 4.0 | 1 | AA | XX |
| 0.8 | 4 | 4 | 0.4 | 6.0 | 1.5 | AA | AA |
| 0.8 | 4 | 4 | 0.4 | 100 | 25 | AA | AA |
| 0.8 | 4 | 4 | 0.4 | Straight | ∞ | AA | AA |
| 0.8 | 4 | 4.5 | 0.4 | 4.0 | 1 | BB | XX |
| 0.8 | 4 | 4.5 | 0.4 | 6.0 | 1.5 | BB | BB |
| 0.8 | 4 | 4.5 | 0.4 | 100 | 25 | BB | BB |
| 0.8 | 4 | 4.5 | 0.4 | Straight | ∞ | BB | BB |

As shown in Table 2, when turning was performed by use of the indexable inserts satisfying the dimensional relationships "θ1 falls within a range of 2 degrees to 4 degrees, and Rb/Ra is equal to or greater than 1.5," turning did not result in chattering, and sufficient burnish was obtained. By contrast, as shown in Table 2, when turning was performed by use of the other indexable inserts, the condition of turning was problematic or unsatisfactory in terms of burnish and occurrence of chattering. Turning by use of the indexable inserts having the first minor cutting edge 21 whose central angle θ1 was 1.5 degrees failed to provide sufficient burnish, which was conceivably caused by an error in relation to clamping of each of the indexable inserts on the holder 2. Turning by use of the indexable inserts having a first minor cutting edge 21 whose central angle θ1 was 4.5 degrees was not free of chattering, conceivably because, in some cases, a clamping-angle error in relation to clamping of each of the indexable inserts on the holder 2 caused the length of contact of the first minor cutting edge 21 with the workpiece to have become excessively great.

Next, a similar test was conducted while the length L of the chord connecting opposite ends P2 and P3 of the arc assumed by the second minor cutting edge 22 and having the radius Rb, and the radius ratio, Rb/Ra, between the first and second minor cutting edges 21 and 22 were varied. The test results are shown in Table 3. The nose radius R was 0.8 mm (constant); the radius of curvature Ra of the first minor cutting edge 21 was 4 mm (constant); and θ1 was 3 degrees (constant).

TABLE 3

| Nose | First minor cutting edge | | Second minor cutting edge | | | Cutting test results | |
|---|---|---|---|---|---|---|---|
| | Ra | | | | | | |
| R | (mm) | θ1(°) | L (mm) | Rb (mm) | Rb/Ra | Chattering | Burnish |
| 0.8 | 4 | 3 | 0.1 | 4.0 | 1 | AA | XX |
| 0.8 | 4 | 3 | 0.1 | 6.0 | 1.5 | AA | BB |
| 0.8 | 4 | 3 | 0.1 | 100 | 25 | AA | BB |

TABLE 3-continued

| Nose | First minor cutting edge | | Second minor cutting edge | | | Cutting test results | |
|---|---|---|---|---|---|---|---|
| | Ra | | | | | | |
| R | (mm) | θ1(°) | L (mm) | Rb (mm) | Rb/Ra | Chattering | Burnish |
| 0.8 | 4 | 3 | 0.1 | Straight | ∞ | AA | BB |
| 0.8 | 4 | 3 | 0.2 | 4.0 | 1 | AA | XX |
| 0.8 | 4 | 3 | 0.2 | 6.0 | 1.5 | AA | AA |
| 0.8 | 4 | 3 | 0.2 | 100 | 25 | AA | AA |
| 0.8 | 4 | 3 | 0.2 | Straight | ∞ | AA | AA |
| 0.8 | 4 | 3 | 0.4 | 4.0 | 1 | AA | XX |
| 0.8 | 4 | 3 | 0.4 | 6.0 | 1.5 | AA | AA |
| 0.8 | 4 | 3 | 0.4 | 100 | 25 | AA | AA |
| 0.8 | 4 | 3 | 0.4 | Straight | ∞ | AA | AA |
| 0.8 | 4 | 3 | 1 | 4.0 | 1 | AA | XX |
| 0.8 | 4 | 3 | 1 | 6.0 | 1.5 | AA | AA |
| 0.8 | 4 | 3 | 1 | 100 | 25 | AA | AA |
| 0.8 | 4 | 3 | 1 | Straight | ∞ | AA | AA |

As shown in Table 3, when turning was performed by use of the indexable inserts satisfying the dimensional relationships "L is equal to 0.2 mm or 0.4 mm, and Rb/Ra is equal to or greater than 1.5," turning did not result in chattering, and sufficient burnish was obtained. By contrast, as shown in Table 3, when turning was performed by use of the other indexable inserts, the condition of turning was problematic or unsatisfactory in terms of burnish and occurrence of chattering.

Finally, a similar test was conducted while the nose radius R was varied within a range of 0.4 mm to 3.2 mm. The radius of curvature Ra of the first minor cutting edge 21 was 4 mm (constant); and θ1 was 3 degrees (constant). The test results are shown in Table 4.

TABLE 4

| Nose | First minor cutting edge | | Second minor cutting edge | | | Cutting test results | |
|---|---|---|---|---|---|---|---|
| | Ra | | | | | | |
| R | (mm) | θ1(°) | L (mm) | Rb (mm) | Rb/Ra | Chattering | Burnish |
| 0.4 | 4 | 3 | 0.4 | 4.0 | 1 | AA | XX |
| 0.4 | 4 | 3 | 0.4 | 6.0 | 1.5 | AA | AA |
| 0.4 | 4 | 3 | 0.4 | 100 | 25 | AA | AA |
| 0.4 | 4 | 3 | 0.4 | Straight | ∞ | AA | AA |
| 1.2 | 4 | 3 | 0.4 | 4.0 | 1 | AA | XX |
| 1.2 | 4 | 3 | 0.4 | 6.0 | 1.5 | AA | AA |
| 1.2 | 4 | 3 | 0.4 | 100 | 25 | AA | AA |
| 1.2 | 4 | 3 | 0.4 | Straight | ∞ | AA | AA |
| 1.6 | 4 | 3 | 0.4 | 4.0 | 1 | AA | XX |
| 1.6 | 4 | 3 | 0.4 | 6.0 | 1.5 | AA | AA |
| 1.6 | 4 | 3 | 0.4 | 100 | 25 | AA | AA |
| 1.6 | 4 | 3 | 0.4 | Straight | ∞ | AA | AA |
| 3.2 | 4 | 3 | 0.4 | 4.0 | 1 | AA | XX |
| 3.2 | 4 | 3 | 0.4 | 6.0 | 1.5 | AA | AA |
| 3.2 | 4 | 3 | 0.4 | 100 | 25 | AA | AA |
| 3.2 | 4 | 3 | 0.4 | Straight | ∞ | AA | AA |

As shown in Table 4, turning by use of the indexable inserts that fall within the scope of the present invention exhibits favorable test results, regardless of the value of the nose radius R. The test results demonstrate the effect of the present invention. From the viewpoint of prevention of chattering, indexable inserts having a small nose radius R are preferred, whereas, from the viewpoint of fracture resistance, indexable inserts having a large nose radius R are preferred.

Furthermore, a similar test was conducted while, at the connection point P1 between the arc assumed by the nose cutting-edge 12 and the arc assumed by the first minor cutting edge 21, the smaller intersectional angle θx of the tangents T12 and T21 to the respective arcs was varied. The test results are shown in Table 5.

TABLE 5

| | First minor cutting edge | | Second minor cutting edge | | | | Cutting test results | |
|---|---|---|---|---|---|---|---|---|
| Nose R | Ra (mm) | θ1 (°) | L (mm) | Rb (mm) | Rb/Ra | θx | Chattering | Burnish |
| 0.8 | 4 | 3 | 0.4 | 6.0 | 1.5 | 0 | AA | AA |
| 0.8 | 4 | 3 | 0.4 | 6.0 | 1.5 | 0.5 | AA | AA |
| 0.8 | 4 | 3 | 0.4 | 6.0 | 1.5 | 1.0 | AA | AA |
| 0.8 | 4 | 3 | 0.4 | 6.0 | 1.5 | 1.5 | AA | XX |
| 0.8 | 4 | 3 | 0.4 | 100 | 25 | 0 | AA | AA |
| 0.8 | 4 | 3 | 0.4 | 100 | 25 | 0.5 | AA | AA |
| 0.8 | 4 | 3 | 0.4 | 100 | 25 | 1.0 | AA | AA |
| 0.8 | 4 | 3 | 0.4 | 100 | 25 | 1.5 | AA | XX |
| 0.8 | 4 | 3 | 0.4 | Straight | ∞ | 0 | AA | AA |
| 0.8 | 4 | 3 | 0.4 | Straight | ∞ | 0.5 | AA | AA |
| 0.8 | 4 | 3 | 0.4 | Straight | ∞ | 1.0 | AA | AA |
| 0.8 | 4 | 3 | 0.4 | Straight | ∞ | 1.5 | AA | XX |

Furthermore, a similar test was conducted while, at the connection point P2 between the arc assumed by the first minor cutting edge 21 and the arc assumed by the second minor cutting edge 22, the smaller intersectional angle θy of the tangents T21 and T22 to the respective arcs was varied. The test results are shown in Table 6.

TABLE 6

| | First minor cutting edge | | Second minor cutting edge | | | | Cutting test results | |
|---|---|---|---|---|---|---|---|---|
| Nose R | Ra (mm) | θ1 (°) | L (mm) | Rb (mm) | Rb/Ra | θy | Chattering | Burnish |
| 0.8 | 4 | 3 | 0.4 | 6.0 | 1.5 | 0 | AA | AA |
| 0.8 | 4 | 3 | 0.4 | 6.0 | 1.5 | 0.5 | AA | AA |
| 0.8 | 4 | 3 | 0.4 | 6.0 | 1.5 | 1.0 | AA | AA |
| 0.8 | 4 | 3 | 0.4 | 6.0 | 1.5 | 1.5 | AA | XX |
| 0.8 | 4 | 3 | 0.4 | 100 | 25 | 0 | AA | AA |
| 0.8 | 4 | 3 | 0.4 | 100 | 25 | 0.5 | AA | AA |
| 0.8 | 4 | 3 | 0.4 | 100 | 25 | 1.0 | AA | AA |
| 0.8 | 4 | 3 | 0.4 | 100 | 25 | 1.5 | AA | XX |
| 0.8 | 4 | 3 | 0.4 | Straight | ∞ | 0 | AA | AA |
| 0.8 | 4 | 3 | 0.4 | Straight | ∞ | 0.5 | AA | AA |
| 0.8 | 4 | 3 | 0.4 | Straight | ∞ | 1.0 | AA | AA |
| 0.8 | 4 | 3 | 0.4 | Straight | ∞ | 1.5 | AA | XX |

As shown in Tables 5 and 6, when the angles θx and θy are 1° or less, occurrence of chattering is suppressed, and sufficient burnish is obtained.

Figure 3:
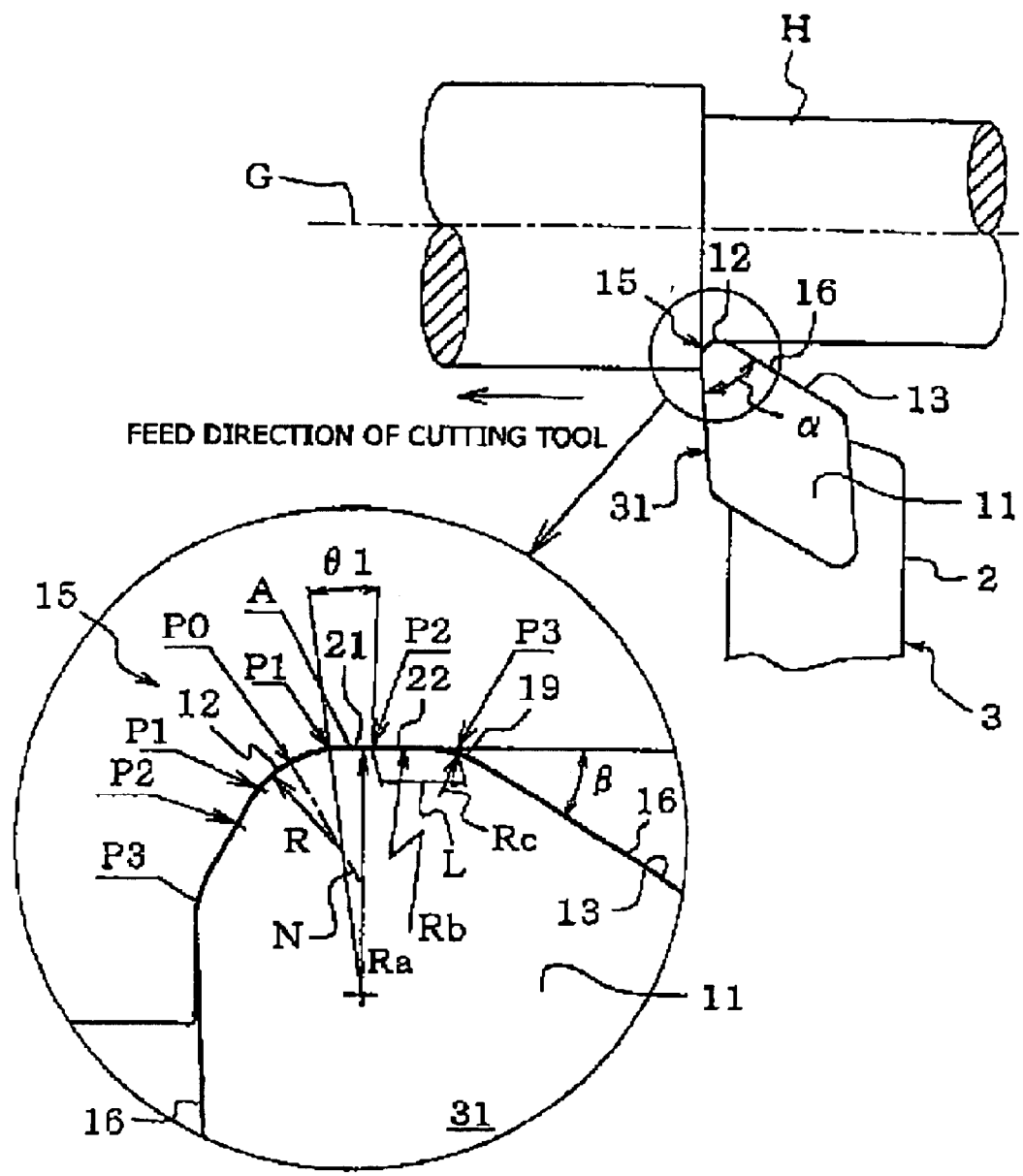
FIG. 3 is a view from the rake face side of an indexable insert according to a second embodiment of the present invention, accompanied by an enlarged view of a nose cutting-edge of the indexable insert and its peripheral portions.

Next, a second embodiment of the present invention will be described with reference to FIGS. 3 and 4. An indexable insert 31 of the present embodiment is substantially similar to the indexable insert of the first embodiment except for assuming a substantially rhombus shape having a nose angle α of 55 degrees. Thus, similar regions are denoted by common reference numerals, and only different features will be described. In the indexable insert 31, since the nose angle α is 55 degrees, the central angle (∠P1OP1) of an arc assumed by the nose cutting-edge 12 becomes small, and the first and second minor cutting edges 21 and 22, which follow the nose cutting-edge 12, become relatively long. In the present embodiment, a portion that corresponds to the connection point P3 in the first embodiment between the linear cutting edge 16 and the arc assumed by the second minor cutting edge 22 and having the radius Rb, is rounded with an appropriate radius; e.g., with a radius Rc is equal or similar to the nose radius R, such that an outwardly projecting arcuate cutting edge 19 is present at the portion.

Figure 4:
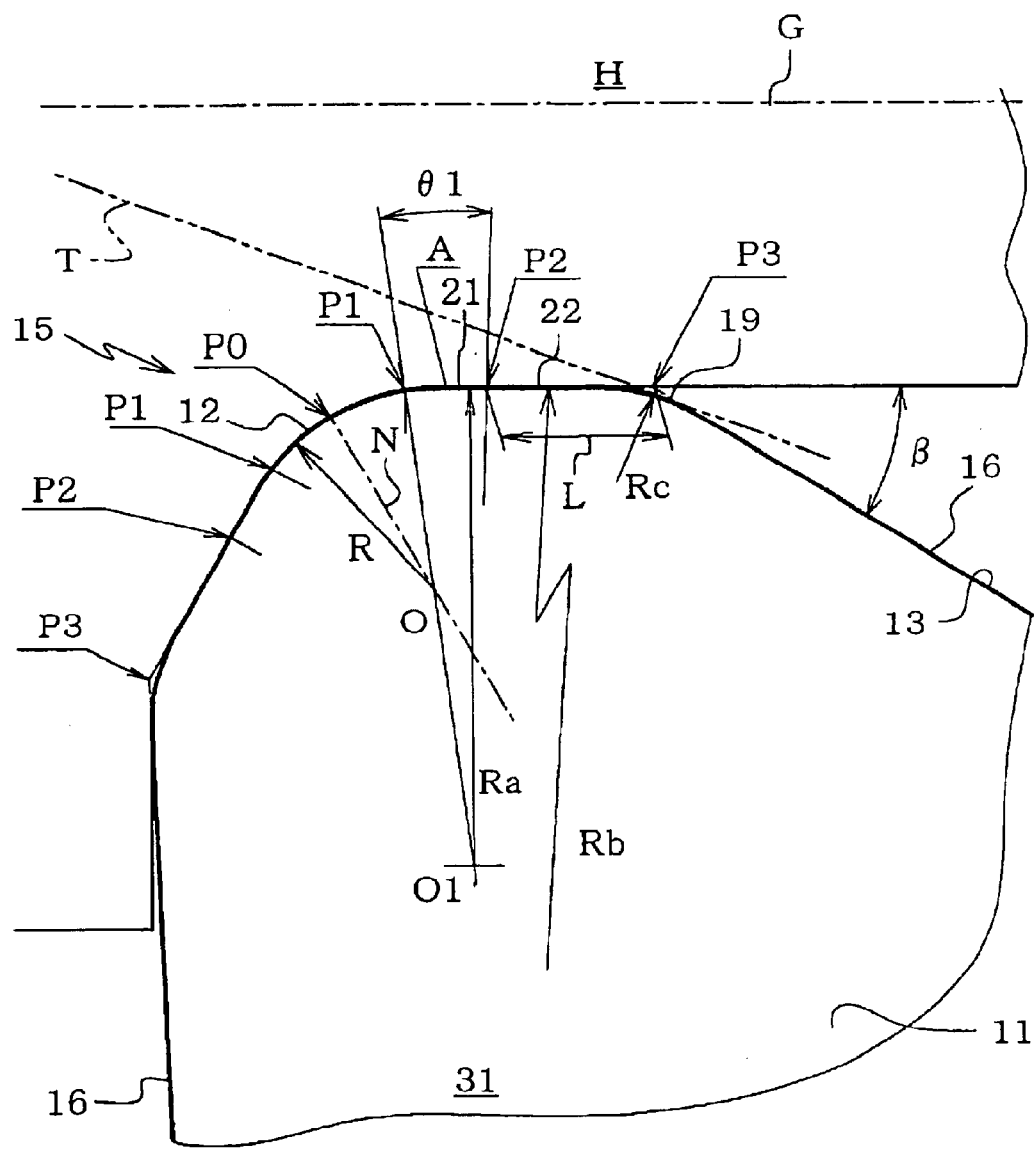
FIG. 4 is a further enlarged view of the enlarged view in FIG. 3.

In the case where, subsequent to cylindrical turning, taper turning is performed along the straight line T shown in FIG. 4, the cutting edge region having the radius Rc carries out cutting of the taper surface of the workpiece. Thus, the finished-surface roughness of the taper portion of the workpiece is improved. In this case, when taper turning is performed after cylindrical turning is performed with a minor cutting edge angle β of 32 degrees, the indexable insert 31 is used to cut a gentle taper of an angle smaller than 32 degrees; for example, a taper of up to 27 degrees. When a taper of a larger angle is to be cut, a tip having a small nose angle α (e.g., 35 degrees) may be used so as to increase the minor cutting edge angle β for cutting the taper. The radius Rc may be set to such a value as to obtain satisfactory surface roughness and to avoid chattering. However, when such taper turning is not involved, provision of an arcuate cutting edge having the radius Rc is not necessary. In this case, as in the case of the first embodiment, the linear cutting edge 16 and the arc assumed by the second minor cutting edge 22 and having the radius Rb may be connected at the connection point P3.

The indexable insert according to the present invention is not limited to the above-described embodiments, but may be embodied in various modified forms without departing from the spirit or scope of the invention. For example, an indexable insert having no clamping hole may be embodied. In other words, the clamping method is not limited to the above-mentioned double clamp mechanism. The indexable insert of the present invention can be embodied while being compatible with other clamp types, such as the lever lock type, the clamp-on type, and the screw-on type. Furthermore, the indexable insert of the present invention can be embodied while employing various nose angles. The above embodiments are described while mentioning a nose that is axisymmetric with respect to the bisector of the nose angle, and thus may be adapted to both the right and left hand of a tool. However, the indexable insert of the present invention is not limited thereto. The present invention can be embodied in the form of an indexable insert having a positive or negative cutting edge or an indexable insert having a chip breaker. Also, the present invention can be embodied in the form of a grooving or cutting-off tip configured such that the corner defined by an end cutting edge and a side cutting edge serves as a nose. Needless to say, no particular limitations are imposed on the indexable insert material. Since the present invention is particularly applicable to the case of cutting a material, such as cast iron, that is difficult to be burnished, ceramic, hard metal, and CBN are preferred.

It should further be apparent to those skilled in the art that various changes in form and detail of the invention as shown and described above may be made. It is intended that such changes be included within the spirit and scope of the claims appended hereto.

This application is based on Japanese Patent Application No. 2003-8908 filed Jan. 16, 2003, incorporated herein by reference in its entirety.

What is claimed is:

1. An indexable insert adapted for turning, which comprises a nose cutting-edge having a nose radius R, a linear cutting edge, and a minor cutting edge formed between the nose cutting-edge and the linear cutting edge, wherein the minor cutting edge comprises a first minor cutting edge having a radius Ra and a second minor cutting edge having a radius Rb, the first and second minor cutting edges successively extending from a nose tip to the linear cutting edge;

the nose cutting-edge and the first minor cutting edge are connected such that, at a connection point between an arc assumed by the nose cutting-edge and an arc assumed by the first minor cutting edge, a smaller intersectional angle θx of a tangent T12 and a tangent T21 to the respective arcs is 1° or less;

the first minor cutting edge and the second minor cutting edge are connected such that, at a connection point between the arc assumed by the first minor cutting edge and an arc assumed by the second minor cutting edge, a smaller intersectional angle θy of the tangent T21 and a tangent T22 to the respective arcs is 1° or less; and wherein Ra>R, Ra falls within a range of 3 mm to 20 mm, and Rb≧1.5 Ra.

2. The indexable insert as claimed in claim 1, wherein the connection point between the arc assumed by the nose cutting-edge and the arc assumed by the first minor cutting edge projects outwardly in relation to the adjacent arcs, and the connection point between the arc assumed by the first minor cutting edge and the arc assumed by the second minor cutting edge projects outwardly in relation to the adjacent arcs.

3. The indexable insert as claimed in claim 1, wherein at least one of the angle θx and the angle θy is 0°.

4. The indexable insert as claimed in claim 1, wherein a central angle θ1 of the arc assumed by the first minor cutting edge falls within a range of 2 degrees to 4 degrees.

5. The indexable insert as claimed in claim 1, wherein the arc assumed by the second minor cutting edge has a chordal length of 0.2 mm or more.

6. The indexable insert as claimed in claim 1, wherein the second minor cutting edge assumes the form of a straight line.

7. The indexable insert as claimed in claim 1, wherein an outwardly projecting arcuate cutting edge is provided at a connection point between the second minor cutting edge and the linear cutting edge.

8. A cutting tool comprising an indexable insert as claimed in claim 1 and a tool holder, the indexable insert being clamped on the tool holder.

* * * * *